Figure 1:
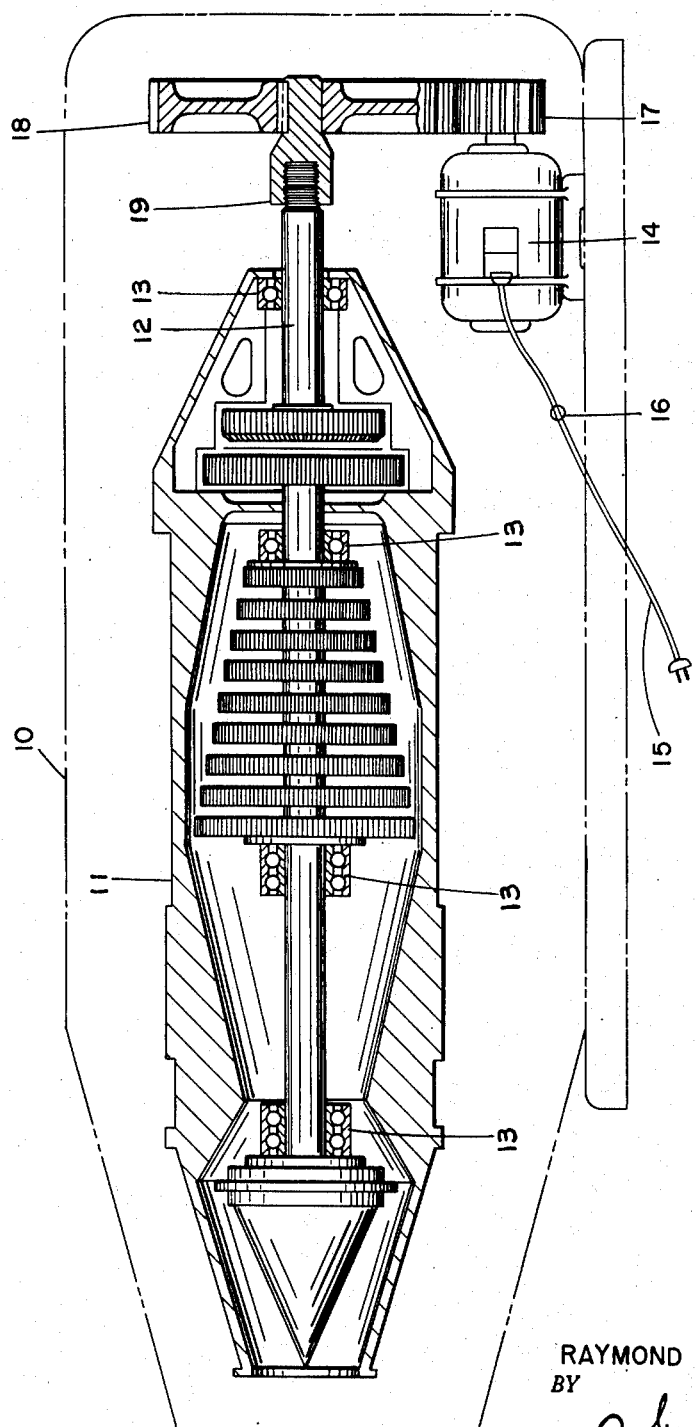

April 28, 1953  R. E. GREENOUGH  2,636,786
METHOD OF PREVENTING INDENTION OF BEARINGS
Filed Nov. 10, 1949

INVENTOR.
RAYMOND E. GREENOUGH
BY

Patented Apr. 28, 1953

2,636,786

UNITED STATES PATENT OFFICE 2,636,786

METHOD OF PREVENTING INDENTION OF BEARINGS

Raymond E. Greenough, Cleveland, Ohio, assignor to The Cleveland Pneumatic Tool Company, Cleveland, Ohio, a corporation of Ohio Application November 10, 1949, Serial No. 126,633

4 Claims. (Cl. 308—1)

This invention relates broadly to the method of preventing shaft supporting bearings of apparatus such as machine tools, engines and the like, from becoming indented or pitted during shipment or storage of such apparatus.

Any goods shipped either by air, water or land, are, while in transit, subjected to a certain amount of vibrations resulting either from engines driving vehicles such as airplanes or boats, or from the unevenness of the road or tracks on which land vehicles travel. In the case of apparatus such as machine tools, engines and others, the shaft supporting bearings are, by virtue of such vibrations, subjected to an intermittent but extremely rapid application of load to a concentrated area, which in time causes the bearings to become indented or pitted to an extent affecting the efficiency of the apparatus, and in extreme cases, necessitating replacement of the bearings before the apparatus can be put to use.

During the storage of such apparatus, it has been found that the static load or pressure exerted by the shaft on its supporting bearings would also cause the bearings to become indented or pitted to an extent affecting the efficiency of the apparatus.

It is therefore the object of this invention to provide a method for preventing indention of such bearings during shipment and storage of the apparatus. To that end, it is contemplated to impart either constant or intermittent rotation to the bearing supported shaft during shipment and storage of the apparatus, thereby causing the pressure resulting from such vibration and static load to be distributed on the greater portion of the bearing area, and preventing indention to take place to any appreciable or detrimental extent.

The invention embodies further characterising features largely of constructional nature and therefore more easily explained with the aid of the accompanying drawing, in which Figure 1 is a diagrammatic sketch showing one arrangement through which rotation is imparted to the bearing supported shaft of the apparatus.

In the following specification and claims, "apparatus" means engines, machine tools and the like provided with one or more main shaft supported by suitable bearings such as ball or roller bearings. "Shipping vibrations" means the vibrations to which such apparatus is subjected as a result of its transportation either by air, water or land. "Indenting" means formation of small depressions or spots in the shaft supporting bearings.

In Figure 1, the dotted line is intended to represent a shipping box or container 10 in which is securely fastened, for purposes of shipment and storage, an apparatus such as a jet engine 11. This engine is shown to have one main shaft 12 supported in longitudinally spaced bearings 13.

Referring now more particularly to the invention, also mounted in the shipping container 10, there is an electric motor 14, hereinafter referred to as auxiliary motor, which has its electric cord 15 extending outside of the container 10, through a hole 16, for connection to a source of electricity. The auxiliary motor 14 has a gear-pinion 17 mounted on its shaft, which pinion meshes with a gear wheel 18 mounted on the jet-motor shaft 12 through a connector 19. In actual practice, the dimensions of the pinion 17 and wheel 18 are calculated to impart rotation to the shaft 12 at a slow rate of speed in one or the other direction, the direction of rotation being of no importance. If desired, the electric motor may also be provided with a time switch, through which its operation, and consequently the rotation imparted to the shaft 12, can be made intermittent.

While the accompanying drawing shows an electric auxiliary motor for imparting rotation to the apparatus shaft, the bearings of which are thereby protected from indention, it is to be understood that any other suitable means such as gasoline motor, spring motor and the like, may be employed for imparting rotation to the apparatus shaft, either constantly or intermittently and in either direction, without departing from the scope or spirit of the invention as herein claimed.

I claim:

1. The method of preventing shipping vibrations from indenting the bearings supporting the shaft of apparatus such as engines or the like, which consists of rotating said shaft intermittently during shipment at a slow rate of speed relative to its normal operative speed.

2. The method of preventing shipping vibrations from indenting the bearings supporting the shaft of apparatus such as engines or the like, which consists of supporting said apparatus in a shipping container and drivenly connecting said shaft to an auxiliary electric motor in said container which is adapted to be energized during shipment of the apparatus for imparting rotation to the shaft at a lower rate of speed than its normal operative speed.

3. The method of preventing shipping vibrations from indenting the bearings supporting the shaft of apparatus such as engines or the like, which consists of disposing said apparatus in a shipping container and imparting rotation to the shaft of said apparatus within said container at a lower rate of speed than its normal operative speed.

4. The method of preventing shipping vibrations from indenting the bearings supporting the shaft of apparatus such as engines or the like, which consists of disposing said apparatus in a shipping container and imparting intermittent rotation to the shaft of said apparatus within said container at a lower rate of speed than its operative speed by a driving mechanism mounted in said container and connected to said shaft.

RAYMOND E. GREENOUGH.

References Cited in the file of this patent

UNITED STATES PATENTS

| Number | Name | Date |
|---|---|---|
| 426,781 | Dewey | Apr. 29, 1890 |
| 1,667,887 | Fallert | May 1, 1928 |
| 2,344,864 | Griswold | Mar. 21, 1944 |